July 8, 1958     J. C. SANDERS     2,842,108
CLOSED-LOOP ACCELERATION CONTROL SYSTEM
Filed Nov. 15, 1955     4 Sheets-Sheet 1

INVENTOR
JOHN C. SANDERS
BY
ATTORNEYS

INVENTOR
JOHN C. SANDERS
BY
ATTORNEYS

July 8, 1958      J. C. SANDERS      2,842,108
CLOSED-LOOP ACCELERATION CONTROL SYSTEM
Filed Nov. 15, 1955      4 Sheets-Sheet 4

INVENTOR
JOHN C. SANDERS
BY
ATTORNEYS

United States Patent Office 2,842,108
Patented July 8, 1958

2,842,108

CLOSED-LOOP ACCELERATION CONTROL SYSTEM

John Claytor Sanders, Lakewood, Ohio

Application November 15, 1955, Serial No. 547,052

13 Claims. (Cl. 123—102)

(Granted under Title 35, U. S. Code (1952), sec. 266)

The invention described herein may be manufactured and used by or for the Government of the United States of America for governmental purposes without the payment of any royalties thereon or therefor.

The present invention relates to a closed-loop acceleration control system and more particularly to a closed-loop acceleration control system for an engine that automatically senses and sets the energizing control element to provide the input energy or quantity that will give the quickest acceleration.

Commonly used acceleration control systems for gas engines provide a schedule of fuel flow against some engine output variable, such as compressor discharge total pressure, or a combination of engine speed and compressor inlet pressure for gas engines that are equipped with compressors. This schedule sets a maximum fuel flow that, at the particular value of the engine output variable, provides the best acceleration. If a command to accelerate, in the form of an increase in fuel flow, exceeds the scheduled fuel flow, the schedule takes command and supplies the engine with the scheduled fuel flow. These controls have the classical disadvantages of a schedule or open-loop control. First, a schedule that is correct for all forseeable environments, such as altitude, speed, temperature, and fuel density, must be established. Then the control must have sensors to continually monitor these environmental conditions. The schedule, which is a multidimensional mathematical surface, must be incorporated in the control in the form of three-dimensional cams, servo-driven, non-linear potentiometers, or function-generating circuits. Such a system is so complicated that existing controls do not schedule for important environments. Second, as the engine is used it deteriorates, causing a gradual change in the fuel flow required for acceleration. Schedule controls do not account for this shift in engine characteristics. Third, each of a series of supposedly similar engines have acceleration characteristics sufficiently different that scheduled controls must have adjustments made after assembly in the engine.

The present invention relates to a control system that, in the case of a gas engine during acceleration periods, continually tests the engine to determine if a greater or lesser fuel flow causes a greater engine acceleration. Small disturbances in fuel flow are injected by the control in time periods very short compared to the acceleration time of the engine. If a small increase in fuel flow decreases the acceleration, the control decreases the average fuel flow. Thus, with this system, experimental determination of the fuel flow for best acceleration under all environmental conditions is unnecessary and the complicated equipment that would be required to contain such knowledge in the system is eliminated. Furthermore, the system does not have to be adjusted to the peculiarities of different engines, and deterioration of the engine does not impair the system's ability to obtain the maximum acceleration.

Accordingly an object of the present invention is the provision of a closed-loop acceleration control system for engines.

Another object of the present invention is to provide a closed-loop acceleration control for gas engines that automatically sets the correct amount of fuel flow for maximum acceleration regardless of environmental conditions.

A further object of the present invention is the provision of a closed-loop acceleration control system for gas engines that during an acceleration period continually tests the engine for optimum fuel flow and sets the fuel flow for maximum acceleration irrespective of environmental conditions.

Still another object is to provide a closed-loop acceleration control for engines that during an acceleration period continually tests the engine for optimum input quantity and sets the input quantity for maximum acceleration irrespective of environmental conditions.

A still further object of the invention is the provision of a closed-loop acceleration control for engines which is employed in conjunction with the normal engine control and which supersedes the normal engine control only when it sets a lower input quantity than the normal engine control.

Other objects and many of the attendant advantages of this invention will be readily appreciated as the same becomes better understood by reference to the following detailed description when considered in connection with the accompanying drawings wherein.

Figure 1:
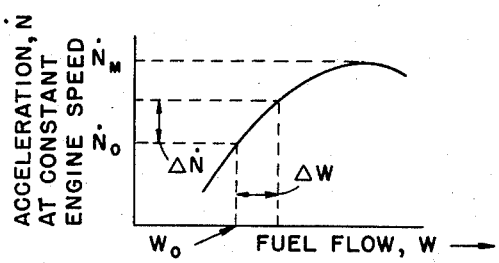
Fig. 1 shows a graph of acceleration vs. fuel flow at constant engine speed for a gas engine.

Referring now to the drawings, wherein like reference characters designate like or corresponding parts throughout the several views, there is shown in Fig. 1 a graph of the acceleration characteristics of a typical gas engine at constant engine speed, wherein acceleration ($\dot{N}$) is the ordinate and fuel flow (W) is the abscissa. It is apparent that at any given engine speed, the acceleration increases to a maximum ($\dot{N}m$) with increase in fuel flow, and that further increase in this flow decreases acceleration. If at a fuel flow, $W_0$, a small disturbance, $\Delta W$, is introduced, the acceleration $\dot{N}_0$ will change by an amount, $\Delta \dot{N}$. If this change, $\Delta \dot{N}$, has the same sign as the fuel flow change, $\Delta W$, the fuel flow, $W_0$, is less than that required for maximum acceleration. Conversely, if the acceleration change, $\Delta \dot{N}$, is of opposite sign to the fuel flow disturbance, $\Delta W$, the fuel flow, $W_0$, is more than that required for maximum acceleration.

Figure 2:
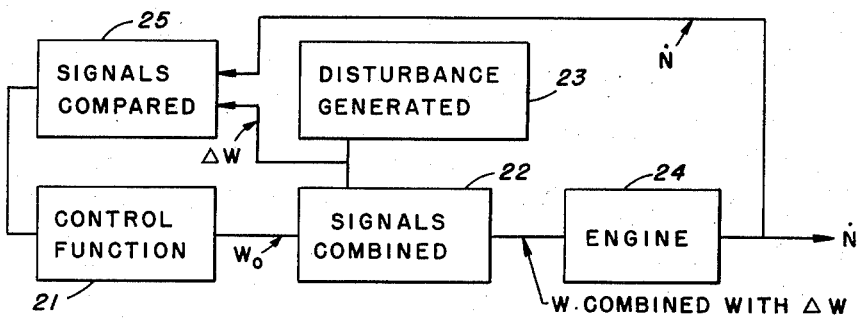
Fig. 2 illustrates a functional block diagram of the control system of this invention.

In the functional block diagram of Fig. 2, the control function 21 establishes a mean fuel flow signal, $W_0$, to the engine 24. $W_0$ is combined by operation 22 (by addition or multiplication, to name two possible combining functions) with the fuel disturbance signal which is generated by function 23, and the combined signal is transmitted to engine 24. The resulting acceleration, $\dot{N}$, is compared with disturbance, $\Delta W$, by action 25 and a signal to increase or decrease fuel flow, $W_0$, is coupled to affect the control function 21. The output signal of action 25 is proportional to the slope of the fuel-flow curve of Fig. 1. Since it is desired to operate at a condition where this slope is zero, this signal may be regarded as an error signal, and thus the control function 21 must be such as to manipulate the fuel flow to force this error to zero. In this respect the resulting control function 21 is exactly like that from any linear closed-loop control. Therefore, the control function 21 can be one of the usual ones, as for example: proportional-plus-integral-plus derivative. This function changes the fuel flow in proportion to: the error, plus the time integral of the error, plus the time derivative of the error. The derivative term is incorporated to compensate for unavoidable delays in the control system. This terminology is standardized in the controls literature.

Figure 3:
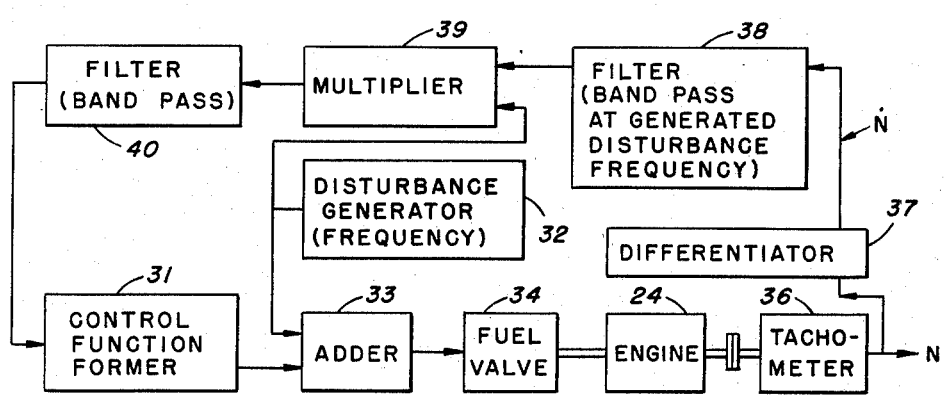
Fig. 3 is a block diagram of one embodiment of this invention.

Several methods of comparing signals can be used, one of which is multiplication of $\Delta W$ and $\dot{N}$ as is illustrated by the system shown in Fig. 3. Here, generator 32 generates a disturbance signal over a narrow band of frequencies much higher than the reciprocal of the engine time constant. This disturbance is added in adder 33 to the output of control function former 31, and the resultant signal controls fuel valve 34 to vary the acceleration of engine 24. Tachometer 36 is joined to engine 24 and thus generates a signal that is a function of the rate of rotation of the engine. The tachometer signal is differentiated by differentiator 37 and then filtered by filter 38, which passes a band at the generated disturbance frequency, and is finally transmitted to multiplier 39, which multiplies the filtered signal by the disturbance signal. The A. C. component of the product signal is twice the disturbance frequency and is thus filtered by low-pass filter 40 which passes low frequencies down to steady state, but eliminates the disturbance spectrum and all higher frequencies. This process of filtering, multiplying, and filtering produces a direct signal whose polarity indicates whether the existing fuel flow is below or above that required for maximum acceleration and whose magnitude provides an indication of the difference in magnitude of the fuel flow from the optimum flow. Control function former 31 then adjusts the fuel flow, via valve 34, to decrease this error direct signal towards zero.

Figure 4:
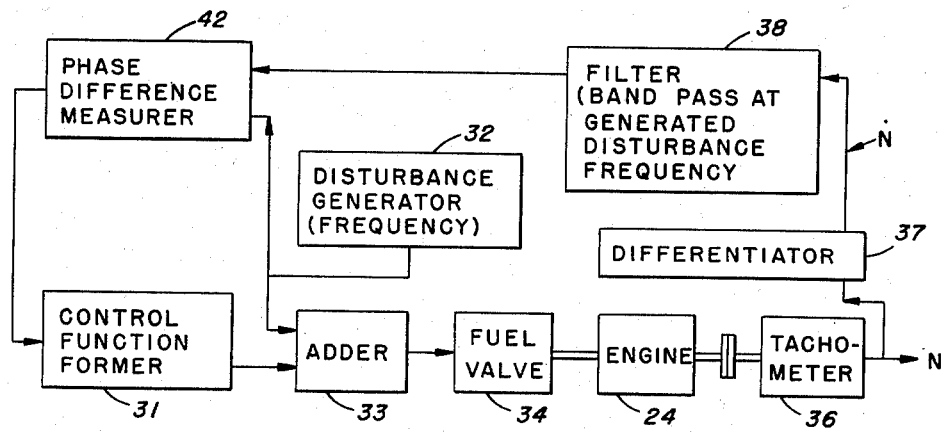
Fig. 4 is a block diagram of another embodiment of this invention.

Another method of comparing signals is to compare the phases of the fuel flow change, $\Delta W$, and the resulting acceleration change, $\Delta \dot{N}$, as is accomplished by the system of Fig. 4. In general, if the fuel flow is less than that required for maximum acceleration, $\Delta W$, and $\Delta \dot{N}$ are approximately in phase, whereas if the fuel flow is more than is required for maximum acceleration, they are approximately 180 degrees out of phase. In the phase measuring embodiment of Fig. 4, the components are identical to those of the multiplication embodiment of Fig. 3, with the exception of the phase-difference measurer 42 which replaces multiplier 39. Phase-difference measurer 42 compares the phases of the fuel flow change, $\Delta W$, and the resulting acceleration change, $\Delta \dot{N}$, and transmits a direct signal to control function former 31, and polarity of the direct signal being dependent upon whether the two inputs are in or out of phase. The presence of filters in this embodiment, as in all the control schemes, is generally advantageous, but would depend upon the specific principles involved in measuring phase difference. There are many suitable phase detectors capable of performing the function of phase-difference measurer 42 one of which is that shown in Fig. 12.14 of Electronic Instruments by Greenwood, Holdam and MacRae, McGraw-Hill Book Co., New York, 1948.

Figure 5:
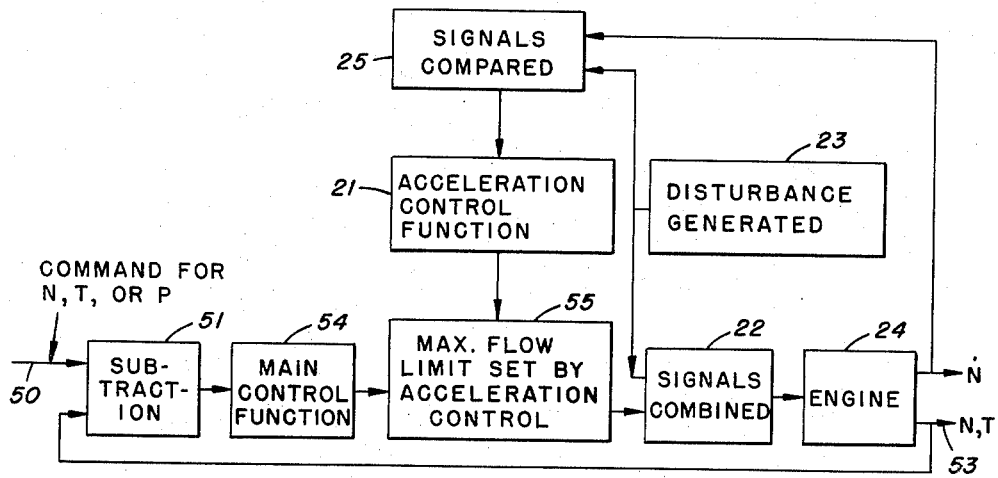
Fig. 5 is a functional block diagram of the control system of this invention employed in conjunction with the normal engine control.

The acceleration control is employed in conjunction with the normal engine control which is used to maintain the engine at a chosen speed, temperature, or pressure. The acceleration control must not interfere with the normal function of the main engine control. This problem is not unique for the acceleration control system herein described, but exists for many acceleration controls now in use. In each case the problem can be solved by arranging the speed control and acceleration control systems so that the system setting the lowest fuel flow has control of the engine. It is preferable to have the disturbance signal in the fuel flow impressed upon the engine at all times, regardless of whether the acceleration control system or the main engine control system has control of the engine. A functional block diagram of a complete control containing the acceleration control and main engine control is illustrated in Fig. 5. This diagram, with the exception of engine 24, shows the circulation of information and operations performed on the information rather than equipment. The normal engine control signal from set-speed throttle 50 (shown in Fig. 6), used to maintain the engine 24 at a chosen speed N, temperature T, or pressure P, is subtracted in subtraction step 51 from the feedback quantity 53 corresponding to the actual N, T, or P of engine 24. Either the resultant main control function 54 or the control function 21 corresponding to maximum acceleration has control of the engine, whichever sets the lowest fuel flow. The maximum flow limit operation 55 is not new, being a common function in existing acceleration controls. In electronic circuits, a diode biased by the acceleration control 21 and passing (within the limits of the bias) the main control 54, is employed. Thus, if the main control demands a greater voltage than the bias, the bias sets the signal transmitted to the engine. In hydraulic systems two valves in series, in which the valve most nearly closed has almost complete control of flow, has been used to approximate this action. The function of the acceleration control system is identical to that of Fig. 2.

Figure 6:
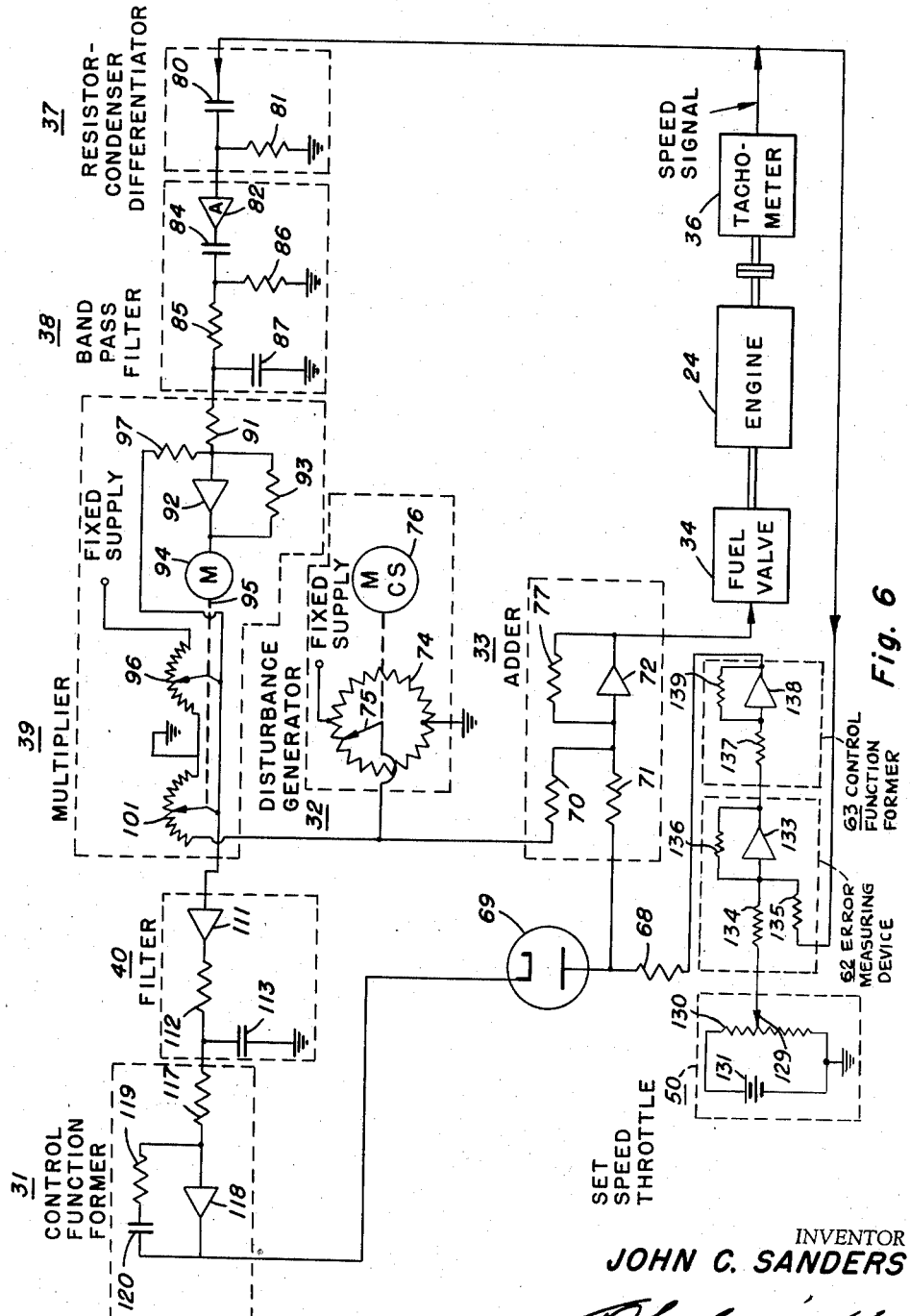
Fig. 6 is a schematic diagram of the embodiment of Fig. 5.
Figure 7:
Fig. 7 is a table showing the equivalence of certain electrical, mechanical, hydraulic and pneumatic components.

The table of Fig. 7 should be considered in conjunction with a reading of the circuit diagram of Fig. 6, for while the components of the latter are generally illustrated to be electrical, they may be either electrical, hydraulic, mechanical, or pneumatic without changing the essential principle of the system, and the table of Fig. 7 shows the equivalent electrical, hydraulic, mechanical and pneumatic components for the symbols employed in Fig. 6. The quantity of interest circulating within the system is not voltage, pressure, or position, but rather information, even though the description of the invention, which is necessarily limited to concrete components, would seem to indicate otherwise. Set-speed throttle 50 consists of a manually operated potentiometer 130 connected across a battery 131. The voltage at wiper arm 129 is the normal engine control signal to maintain the engine 24 at a chosen speed which corresponds to a particular setting of wiper arm 129. The voltage from potentiometer 130 is coupled to the input of error measuring device 62 which comprises resistor 134, resistor 135 and degenerative amplifier 133, which has a degenerative feedback path through resistor 136. A signal corresponding to the output performance of engine 24 is coupled to the input of amplifier 133 through resistor 135. The output signal from amplifier 133 is coupled to control function former 63 which comprises resistor 137 and degenerative amplifier 138, which has a degenerative feedback path through resistor 139. The error measuring device 63 compares the signal from set-speed throttle 50 with the signal corresponding to the output performance of engine 24. If there is any difference, error measuring device 62 transmits an error signal to control function former 63 which converts this error signal into a control signal having proper characteristics to operate fuel valve 34 to render engine 24, and thus the feedback signal, more in accord with the normal throttle signal from set-speed throttle 50. Resistor 68 causes the conventional speed control 63 to be ineffective when the acceleration signal from control function former 31 is less than the speed control signal from control 63. When the acceleration control signal is greater than the speed control signal, diode 69 makes the acceleration control ineffective. Disturbance generator 32 generates a disturbance signal that is preferably, but not necessarily, a sine wave that is conducted by resistor 70 to the input of degenerative amplifier 72, which has a degenerative feedback path through resistor 77. If a sine wave disturbance is desired, generator 32 could comprise a circular potentiometer 74 whose arm 75 is rotated at a constant speed by motor 76. Depending upon the operation of the switching means comprising diode 69 and resistor 68, either the output from the acceleration control or that from the speed control is connected through resistor 71 to the input to amplifier 72. The resultant added signal controls the operation of fuel valve 34 and thus also the fuel flow to engine 24. Tachometer 36 provides a voltage that is proportional to the instantaneous rate of engine 24, and this voltage is differentiated by differentiator 37, comprising capacitor 80 and resistor 81, and then filtered by filter 38, comprising amplifier 82, capacitors 84 and 87, and resistors 85 and 86. Band-pass filter 38 discriminates against the low frequency and direct current signal equivalent of a slow acceleration of engine 24 and improves the signal-to-noise ratio of the acceleration signal, passing the latter to multiplier 39. The multiplier input is conducted through resistor 91 and degenerative amplifier 92 with feedback resistor 93, to motor 94. The motor circuit is in a closed-loop system comprising: shaft 95, potentiometer 96, resistor 97, and amplifier 92, all of which perform a typical follow-up function. Thus, the movement of shaft 95 is a function of the input acceleration signal to the multiplier. Since one end of the resistance element of potentiometer 101 is grounded and the other end is connected to the output of generator 32, the output of the multiplier 39, which is taken from the arm of potentiometer 101, is dependent not only on the position of the arm but also on the output of generator 32. This dependency is actually a product function of the input acceleration and disturbance signals. Filter 40, comprising series amplifier 111, resistor 112, and grounded capacitor 113, passes the D. C. component of the product signal from multiplier 39, to control function former 31. It can be verified mathematically that this D. C. component has a polarity which indicates whether the existing fuel flow is below or above that required for maximum acceleration and has a magnitude which is an indication of the difference in magnitudes of the existing fuel flow from the optimum flow. Control function former 31 has a resistor 117 in series with amplifier 118 and a feedback path for amplifier 118 consisting of capacitor 120 and resistor 119. Former 31 converts the input D. C. signal into an output signal of proper characteristics to operate the fuel valve 34, and hence engine 24 and tachometer 36, to reduce this D. C. input towards zero and thus bring the engine operating point closer to optimum, i. e. maximum acceleration.

In the table of Fig. 7, the vertical row under "symbol" shows the symbols employed in Fig. 6. The other vertical rows illustrate the corresponding electrical, mechanical, hydraulic and pneumatic equivalents of these symbols; all of the equivalents of any one symbol being in the same horizontal row as that symbol. As previously stated, the components of this invention may be either electrical, hydraulic, mechanical, or pneumatic, and it involves mere skill rather than invention to connect any specific components together in the manner indicated by the generic showing of Fig. 6.

Although the description of this invention has been directed to its employment with a gas engine, the invention can be used with any machine whose output reaches a maximum value with adjustment of some regulated input quantity, and show less output for either greater or lesser setting of the input. Obviously, there are many engines, other than gas engines, that meet this requirement.

Obviously many modifications and variations of the present invention are possible in the light of the above teachings. It is therefore to be understood that within the scope of the appended claims the invention may be practiced otherwise than as specifically described.

What is claimed is:

1. An acceleration control system for an engine, said system comprising: first means having an output for varying the energization of said engine, and second means responsive to the output of said first means and the acceleration of said engine for producing a signal that is an indication of whether the existing energization is below or above that required for maximum acceleration and of the difference in magnitude therefrom.

2. The system of claim 1, and third means for utilizing said signal to bring said engine to maximum acceleration.

3. An acceleration control system for a gas engine, said system comprising: first means having an output for injecting small disturbances in fuel flow to the fuel valve thereby decreasing and increasing the acceleration of said engine, and second means responsive to the output of said first means and the acceleration of said engine for raising the average flow of fuel if a small increase in fuel increases acceleration and for decreasing the average flow of fuel if a small increase in fuel decreases acceleration.

4. An acceleration control system for a gas engine, said system comprising: first means having an output for injecting small disturbances in fuel flow to said engine, and second means responsive to output of said first means and the acceleration of said engine for providing an average fuel flow that will give maximum acceleration of said engine.

5. An acceleration control system for an engine, said system comprising: first means for injecting small disturbances in the energization to said engine, and second means responsive to said first means and the acceleration of said engine for providing an average energization that will give maximum acceleration of said engine.

6. A process for producing the maximum acceleration of an engine, comprising the steps of: producing a disturbance signal for increasing and decreasing, by small amounts, the average energization of said engine thereby varying engine acceleration; producing an acceleration signal which is a function of engine acceleration; producing a product of said disturbance signal and said acceleration signal; increasing the average energization if said product has a positive sign; and decreasing the average energization if said product has a negative sign.

7. A process for producing the maximum acceleration of an engine, comprising the steps of: producing a disturbance signal for increasing and decreasing, by small amounts, the average energization of said engine thereby varying engine acceleration; producing an acceleration signal which is a function of engine acceleration; comparing the phases of said disturbance signal and acceleration signal; increasing the average energization of said engine if said disturbance signal and said acceleration signal are approximately in phase; and decreasing the average energization of said engine if said disturbance signal and said acceleration signal are approximately 180 degrees out of phase.

8. An acceleration control system for a gas engine having a fuel valve, said system comprising: a control function former for producing a control signal to control said valve to establish an average fuel flow for said engine; a source for producing a disturbance signal of alternating polarity; adding means for producing an added signal of said control signal and said disturbance signal; leads for conducting said added signal to said fuel valve for varying the fuel flow to said engine, whereby changes in acceleration are produced; means for producing a signal that is a function of the instantaneous speed of said engine; means for producing a differentiated signal of the speed signal; filter means for producing a first filtered signal consisting of the portion of said differentiated signal which is at the same frequency as said disturbance signal; multiplying means for producing a product signal which is a product of said disturbance signal and said first filtered signal; low-pass filter means for producing a second filtered signal from said product signal from which the disturbance frequency and all higher frequencies are eliminated; and leads for conducting said second filtered signal to said control function former whereby the control function former produces a change in control signal to change the average fuel flow in a direction to give maximum acceleration of said engine.

9. The system of claim 8 wherein all the components are electrical.

10. An acceleration control system for a gas engine having a fuel valve, said system comprising: a control function former for producing a control signal to control said valve to establish an average flow of fuel to said engine; a source for producing a disturbance signal of alternating polarity; adding means for producing an added signal of said control signal and said disturbance signal; leads for conducting said added signal to said fuel valve for varying the fuel flow to said engine where changes in acceleration are produced; means for producing an acceleration signal which is a function of the instantaneous rate of said engine; phase comparison means for comparing the phases of said disturbance signal and said acceleration signal and for producing an input signal to said control function former whereby said control signal is changed to decrease the average fuel flow if said disturbance signal and said acceleration signal are approximately 180 degrees out of phase and is changed to increase the average fuel flow if said disturbance signal and said acceleration signal are approximately in phase.

11. The system of claim 10 wherein all the components are electrical.

12. An acceleration control system for an engine having a fuel valve, for use in conjunction with the normal engine control signal, said system comprising: first means having an output for injecting small increases and decreases in fuel flow to said engine thereby increasing and decreasing the engine acceleration; second means responsive to the output of said first means and the acceleration of said engine for producing an acceleration signal which if connected to said fuel valve will raise the average flow of fuel if a small increase in fuel increases acceleration and that will decrease the average flow of fuel if a small increase in fuel decreases acceleration, and switch means for connecting either said acceleration signal or said normal engine control signal to said fuel valve depending upon whichever is of a characteristic to set the lowest fuel flow.

13. The system of claim 12 wherein all the components are electrical.

References Cited in the file of this patent
UNITED STATES PATENTS
2,628,606     Draper et al. _____ Feb. 17, 1953